Aug. 13, 1940.   A. NUTTING   2,211,382
AIR FILTER
Filed Dec. 17, 1936   3 Sheets-Sheet 1

INVENTOR.
Arthur Nutting
BY Arthur J. Robert
ATTORNEY

Aug. 13, 1940.                A. NUTTING                2,211,382
                               AIR FILTER
                       Filed Dec. 17, 1936        3 Sheets-Sheet 2
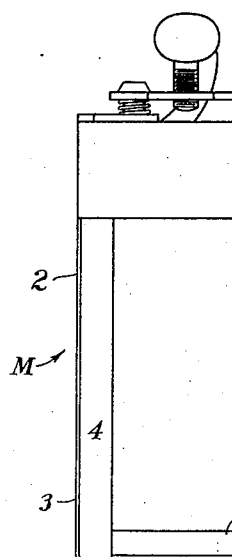
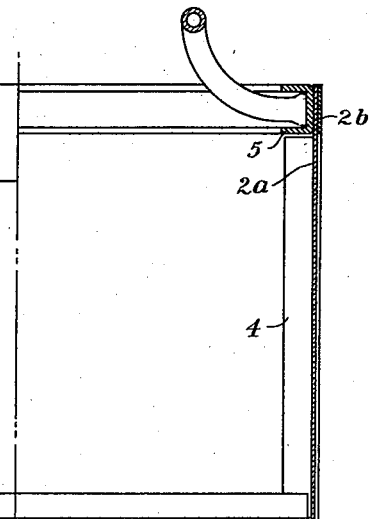
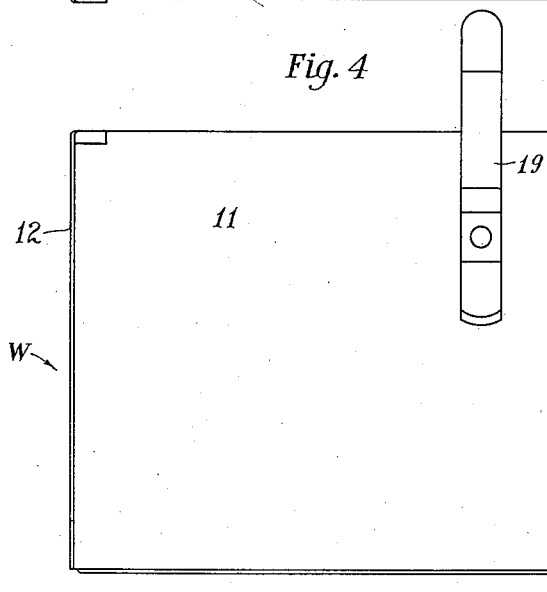
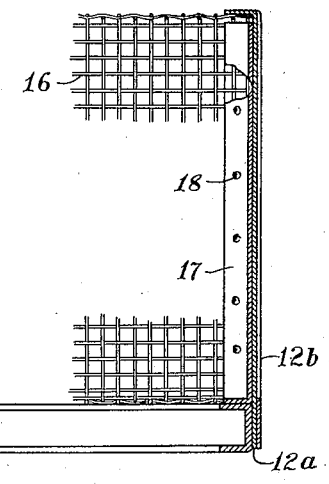
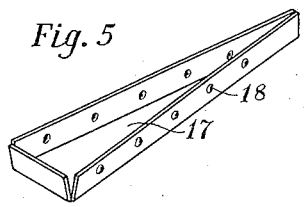
INVENTOR.
Arthur Nutting
BY Arthur J. Robert
ATTORNEY Aug. 13, 1940.  A. NUTTING  2,211,382
AIR FILTER
Filed Dec. 17, 1936   3 Sheets-Sheet 3

INVENTOR.
Arthur Nutting
BY Arthur J. Robert
ATTORNEY

Patented Aug. 13, 1940

2,211,382

UNITED STATES PATENT OFFICE 2,211,382

AIR FILTER

Arthur Nutting, Louisville, Ky., assignor to American Air Filter Company, Inc., Louisville, Ky., a corporation of Delaware Application December 17, 1936, Serial No. 116,318

3 Claims. (Cl. 183—71)

This invention relates to improvements in air filters.

The principal objects of the invention are: to provide a unit type of renewable filter structure which is comparatively inexpensive to manufacture, easy to handle and light in weight; to provide one in which the dead or non-filtering space is reduced to a minimum; and to provide one in which the filter medium can be easily and quickly removed and replaced.

Another object is to provide a structure having novel filter medium retaining and sealing features.

A further object is to provide a unique form of latch for holding the unit in place.

A structure embodying my invention is illustrated in the accompanying drawings, wherein:

Figures 3 and 4 are similar views at right angles to Figures 1 and 2 respectively;

Figure 5 is a perspective of a screen retaining member;

The air filter unit illustrated comprises a pair of separable frames M and W, each having open outer and inner ends. These frames may be removably secured together with their inner ends in mating relation wherein they cooperate to hold a filter medium positioned between them. The mating end of each frame is characterized by a series of fixed open sided corrugations which are adapted to nest into the corrugations on the other frame when both frames are mated. Although the frames M and W may be variously shaped and constructed both preferably are rectangularly shaped and constructed in the manner illustrated and hereinafter described.

The rectangular mating frame M includes a pair of spaced side walls 1 and another pair of similarly spaced, but oppositely disposed, side walls 2 all of which are suitably secured together, preferably at the corners of the frame. The side walls 1 form straight margins at both ends of the frame, while the side walls 2 form straight margins at the outer end of the frame and corrugated margins at the inner end thereof. Accordingly, each side wall 2, at the inner end of the frame, is provided with a series of serrations which form teeth or fingers 3 extending in the direction of the air flow, the spaces between fingers being open sided.

Figure 1:
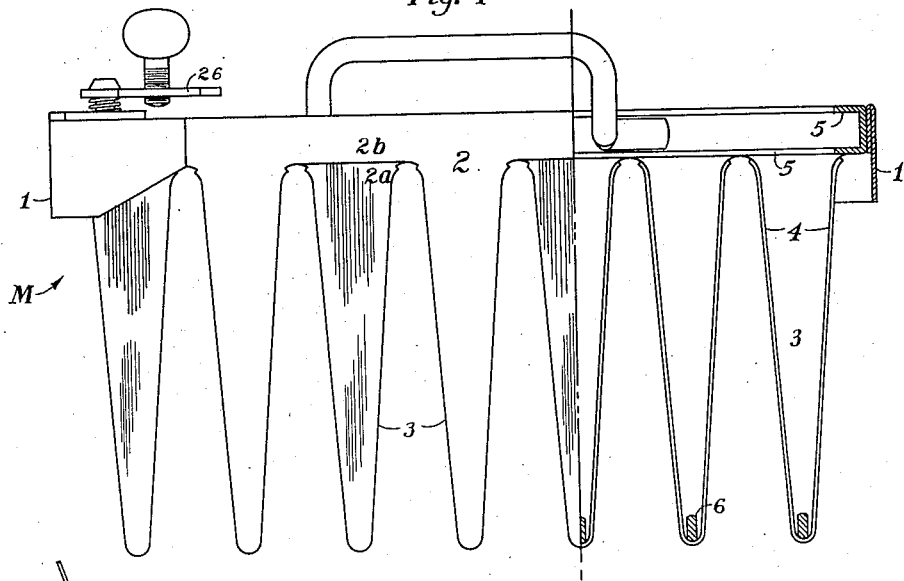
Figures 1 and 2 are corresponding views partly in side elevation and partly in sections of opposed frame parts.
Figure 2:
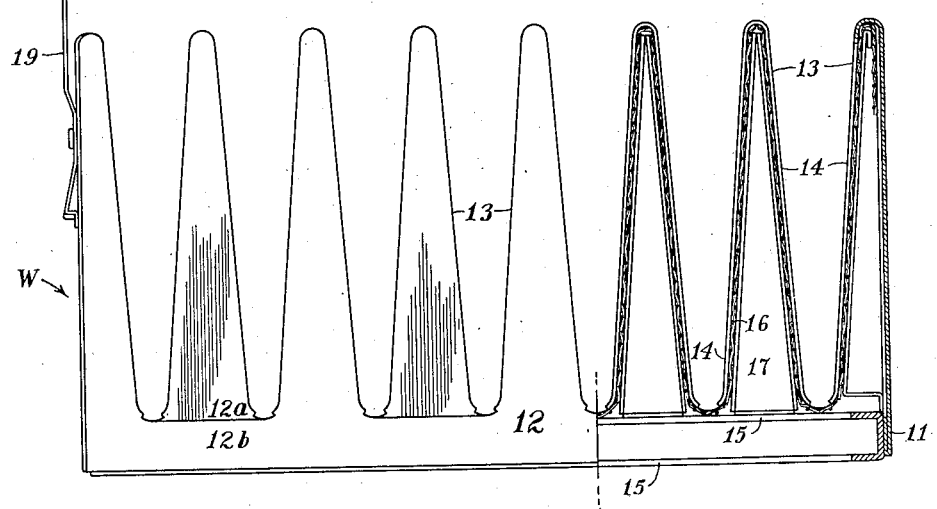
Figure 6:
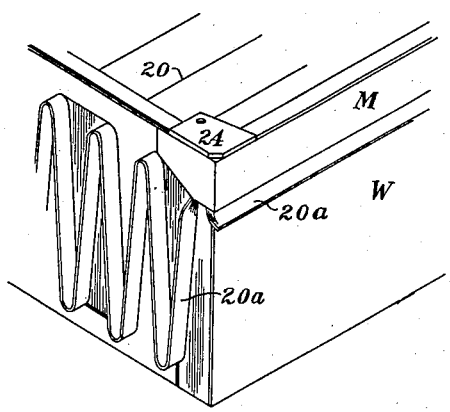
Figure 6 is a perspective of one corner of the unit showing the protruding edges of a filter medium.
Figure 8:
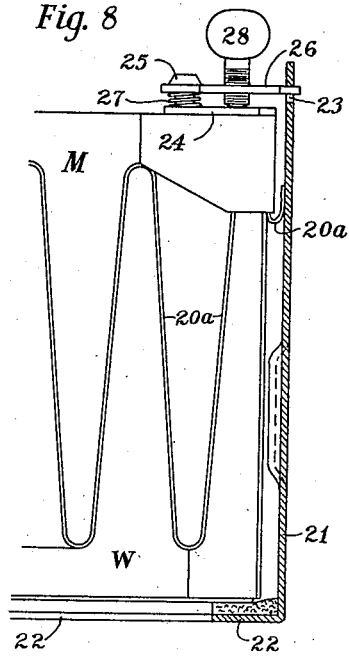
Figure 8 is an enlarged section showing the relation of the unit (in elevation) to the auxiliary frame (in section), this view corresponding to one taken on line 8—8 of Figure 9.
Figure 7:
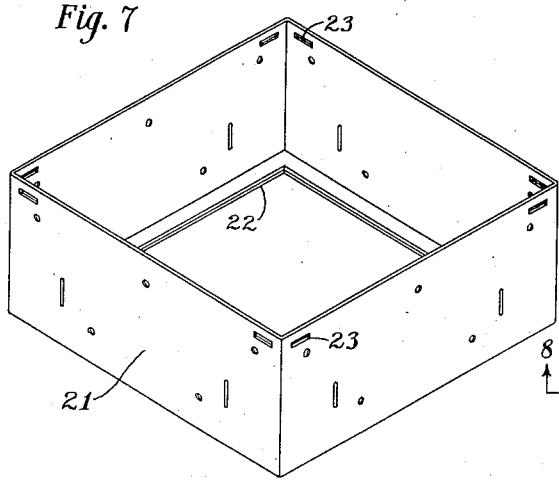
Figure 7 is a perspective of an auxiliary frame.
Figure 9:
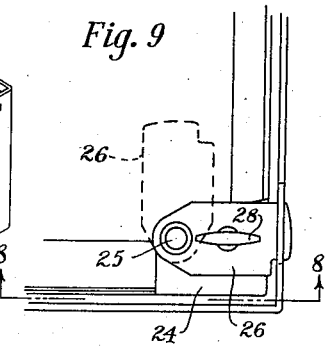
Figure 9 is a top plan view of the corner shown in Figure 8.

The opposed side walls 1 of the frame M may be and preferably are both composed of a single sheet of metal of suitable thickness. To facilitate the provision of inwardly directed flanges 4 along the marginal edges of the teeth 3, the other opposed side walls 2 preferably are both composed of an inner sheet 2a and an outer sheet 2b, these sheets being serrated to provide alternate teeth or fingers 3 and thereby insure spacing between the teeth of each sheet sufficient to permit the formation of the flanges 4 out of the same sheet. If desired the frame may be strengthened at its outer end by fitting a shallow open faced rectangular casing 5 into the mouth of the frame and securing it to the side walls. The casing 5 is composed of inwardly facing structural U-shaped members or channels. In addition to providing added rigidity, the casing 5 cooperates with the flanges 4 of the teeth 3 (see Figure 1) to form a series of shallow inwardly facing triangular cups, each of which has the inner face of a tooth as a base.

The construction of the other mating frame W is substantially the same as that of the mating frame M previously described. It therefore includes side walls 11 and 12 which are arranged in a manner generally similar to the side walls 1 and 2 and in which the side wall 12 is composed of inner sheet 12a and outer sheet 12b serrated to provide alternate teeth or fingers 13 having flanges 14. It will be noted that the end teeth of the side walls 12 are cut in half, from apex to base, and that the side walls 11 extend from the outer face of the frame to the apex of the cut teeth so as to meet with the shorter side walls of the other frame when both frames are mated. The frame W also includes a strengthening casing 15 which adds rigidity to the structure and cooperates with the flanges 14 to form a series of shallow inwardly facing triangular cups.

It is generally desirable and usually necessary to support a filter medium, positioned between frames, against the force of the air flow. Consequently filter medium supporting means are provided on one frame or the other depending upon the direction of air flow through the unit. In the present case it is assumed that air will enter the frame M and leave the frame W; hence the air outlet frame W is provided with a filter medium support in the form of a woven wire screen 16. This screen extends across the mating face of the frame W and is corrugated to conform to the outline of the teeth 13. Its straight end margins extend along and are suitably secured to opposed side walls 11 while its corrugated side margins are retained within the margins of the teeth by the flanges 14. The side margins of the screen are firmly held against the teeth flanges 14 by wedging a triangular cup shaped piece 17 into the triangular cup formed by the flanges 14 and the casing 15. The cup piece 17 can be held in place by a single spot weld connecting its base to the base of the cup into which it extends. The sides or flanges of the cup 17 are sprung outwardly and also provided with nubs 18 which extend into the interstices of the screen, to insure the firm anchoring of the screen 16 between cup flanges. With the screen so anchored it is unnecessary to weld or otherwise further secure the screen to the flanges.

The air inlet frame M is also provided with filter medium or fold retaining member but these may be made in the form of a series of bars 6, one extending from the apex of each tooth on one side wall 2 to the apex of each corresponding tooth on the opposed side wall.

With a filter medium extending across the mating face of frame W and into the folds thereof and with the mating frame M placed over and in mating relation with the frame W, the filter medium is not only held across the air flow but both of its straight end margins are pinched between and therefore sealed by the side walls 1 and 11 while both of its corrugated side margins are similarly pinched between and sealed by the teeth flanges 4 and 14 on side walls 2 and 12. The mating frames may be removably secured in mating relation in any suitable manner as by mounting spring arms on one frame to engage over the edge of the other frame. In the present embodiment such arms 19 are pivotally mounted on the side walls 11 of the air outlet frame W for sidewise movement from a releasing position, wherein they extend entirely along the side walls 11, to a securing position wherein they extend across the side walls 1 of the mating frame M and over the outer face edge thereof. To facilitate the handling of the unit, a pair of handles may be secured to the casing 5 of the air inlet frame.

The foregoing unit structure has a number of advantages. It is cheap to manufacture because of the simple shapes and arrangements of its various parts. It is easy to handle because its shallow corrugations render it compact and permit the use of light gauge sheet metal in the frames thus keeping its weight at a minimum. It has substantially no non-filtering or dead space between its walls; hence its initial air flow resistance is reduced to a minimum. Its frames are easily separated and mated and, when separated, the filter medium can be easily and quickly removed and replaced while, when mated, the marginal edges of the medium are automatically and thoroughly sealed.

Another and important advantage arises from the fact that the sealed edges of the frames permit the filter medium 20 to extend outwardly beyond the confines of the frame on all sides thereof. Consequently when the unit is placed in an auxiliary frame 21 the protruding portion 20a of the filter medium 20 is compressed between the side walls of the unit and the auxiliary frame forming there-between an effective endless seal. In this connection it may be noted that a series of open faced auxiliary frames, such as the frame 21, are commonly secured in side by side and superposed relation to form a bank of unit receiving openings across the air flow. The units are inserted into and withdrawn from the front openings of the auxiliary frames and when inserted are pressed against an inwardly directed sealing flange, such as the flange 22 on the auxiliary frame 21, adjacent its rear face, this flange usually being provided with a resilient sealing material such as felt.

Suitable means are usually employed to hold the unit firmly against the auxiliary frame sealing flange 22. In the present embodiment a novel holding means is mounted on each corner of the outer face of air inlet frame M for engagement in adjacent slots 23 which are formed in each front corner of the auxiliary frame 21. To this end, the outer air inlet end of the frame M is provided at its corners with an end plate 24. The plate 24 carries a stud 25 on which a latch 26 is loosely mounted for sidewise pivotal movement about the stud in a plane parallel to the plate 24 and for limited pivotal movement toward and away from the end of the unit. The latch 26 is resiliently forced outwardly along the stud 25 by a spring 27 but it may be moved from a latching position, in which its free end engages auxiliary frame 21 by extending through slot 23 thereof, to a nonlatching position, in which its free end disengages the auxiliary frame entirely. The latch carries between its ends a screw 28 which, in latched position, may be turned to move into engagement with the plate 24, and, through such engagement, force the unit tightly against the sealing flange 22.

In the foregoing description the air flow has been assumed to pass through the auxiliary frame from its front opening to its rear flanged opening. With such flow the described unit must be positioned with its air inlet and outlet frames M and W respectively arranged adjacent the front inlet and rear outlet openings of the auxiliary frame. However, where the air flow through the latter is reversed, it is necessary either to provide frame M with a filter medium supporting screen or to reverse the position of the unit in the auxiliary frame. The reversal of the unit is preferred since only minor changes are necessary to adapt it for operation in such reversed position. These changes comprise mounting the securing arms 19 on frame M instead of frame W and mounting the handles and unit latching means 26 etc., on frame W instead of frame M.

Having described the invention, I claim:

1. In combination with a filter unit, having an open-ended frame, of a latch member pivotally mounted on said frame for sidewise movement about its pivot parallel to and over a portion of one end of said frame, and for limited pivotal movement toward and from said end; and a screw carried by and between the pivoted and the free ends of said latch member, said screw being adapted for screw movement in opposite directions with its inner end in engagement with said frame so as to move the free end of said latch member toward and away from said frame within the limits of the pivotal movement of said latch member.

2. An open-ended frame part for a filter unit comprising: side walls for confining the air passing through said frame, two opposed side walls being serrated to form opposed fingers extending in the direction of the air-flow, the spaces between adjacent fingers of each wall, being open-sided; flanges on each finger directed laterally of said frame; a corrugated screen extending from one to the other of said opposed side walls and retained within the margins of said fingers by said flanges; flange providing means secured to said side walls in position to cooperate with said serrations and serration flanges to form at least one inwardly facing cup; and a similar cup member wedged into said inwardly facing cup to anchor said screen between said serration flanges and said cup member.

3. A frame part as defined by claim 2 wherein said cup member is provided with nubs which engage into the interstices of said screen.

ARTHUR NUTTING.